US006942455B2

(12) United States Patent
Schmaling et al.

(10) Patent No.: US 6,942,455 B2
(45) Date of Patent: Sep. 13, 2005

(54) STRAIN ISOLATED TRIM TAB

(75) Inventors: David N. Schmaling, Southbury, CT (US); James B. Carleton, New Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/460,119

(22) Filed: Jun. 12, 2003

(65) Prior Publication Data

US 2004/0253108 A1 Dec. 16, 2004

(51) Int. Cl.[7] ................................................ B64C 11/28

(52) U.S. Cl. ........................... 416/23; 416/24; 416/226; 416/229 R; 244/11; 244/22; 244/75 R; 244/215

(58) Field of Search ............................ 416/23, 24, 226, 416/229 R; 244/11, 22, 75 R, 215

(56) References Cited

U.S. PATENT DOCUMENTS

| | | | | |
|---|---|---|---|---|
| 4,188,171 A | * | 2/1980 | Baskin | 416/229 R |
| 5,111,676 A | | 5/1992 | Ruzicka, Jr. et al. | |
| 5,226,618 A | * | 7/1993 | Greenhalgh | 244/215 |
| 5,335,886 A | * | 8/1994 | Greenhalgh | 244/215 |
| 5,639,215 A | | 6/1997 | Yamakawa et al. | |
| 6,220,550 B1 | * | 4/2001 | McKillip, Jr. | 244/215 |
| 6,231,013 B1 | | 5/2001 | Jaenker | |
| 6,322,324 B1 | | 11/2001 | Kennedy et al. | |
| 6,447,254 B1 | * | 9/2002 | Holowczak et al. | 416/226 |

* cited by examiner

*Primary Examiner*—Theresa Trieu
(74) *Attorney, Agent, or Firm*—Carlson, Gaskey & Olds

(57) ABSTRACT

A rotor blade assembly system includes a trim tab assembly which utilizes relatively thick resilient members bonded between a trim tab and the two trim tab doublers. Spanwise segmenting of the tab and the use of thick resilient member isolates the trim tab from normal strain. Because the trim tab is made of aluminum, the tab can be readily adjusted the field using a conventional tool.

14 Claims, 3 Drawing Sheets

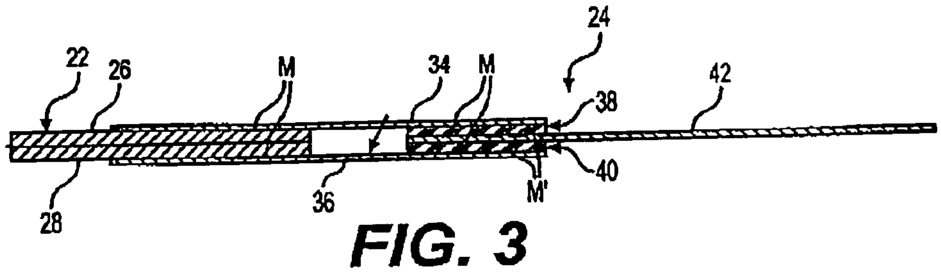
FIG. 3
| TABLE 1 | | | | |
|---|---|---|---|---|
| # | TAB LENGTH | BOND LINE STIFFNESS | BOND LINE THICKNESS | MAX TAB NORMAL STRAIN UIN/IN |
| A | SHORT | RESILIENT | THIN | 844 |
| B | SHORT | RESILIENT | THICK | 125 |
| C | SHORT | STIFF | THIN | 2000 |
| D | SHORT | STIFF | THICK | 2000 |
| E | LONG | RESILIENT | THIN | 2000 |
| F | LONG | RESILIENT | THICK | 1920 |
| G | LONG | VERY RESILIENT | THICK | 1382 |
| H | LONG | STIFF | THIN | 2000 |
| J | LONG | STIFF | THICK | 2000 |
| | |
|---|---|
| ALLOWABLE ALUMINUM FATIGUE | 346 |
FIG. 5
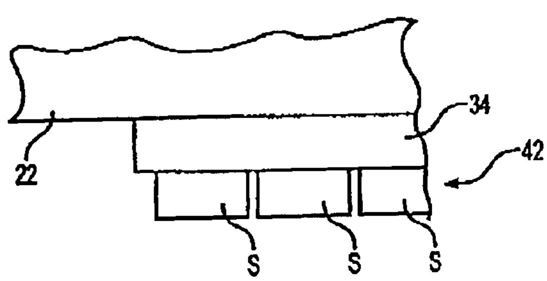
FIG. 4

STRAIN ISOLATED TRIM TAB

BACKGROUND OF THE INVENTION

The present invention relates to a rotor blade, and more particularly to an isolated trim tab for a rotor blade.

A rotary wing aircraft typically utilizes multiple rotor blades mounted to a rotor hub. A trim tab is a long, thin tab extending off the trailing edge of the rotor blade that can be bent along its length about a spanwise axis. Trim tabs change the effective airfoil shape and thus change the lift, drag, and bending-moment coefficients of the rotor blade airfoil at the local spanwise position of the tab. The ability to adjust these local airfoil parameters increases the amount of adjustment available to control global blade characteristics such as pitching moment slope, track, flutter stability, vibrations, and bending mode shapes.

Conventional trim tabs are typically either of an aluminum or composite structure. Aluminum trim tabs are often of a three-piece configuration in which a thin aluminum tab is sandwiched between two aluminum doublers mounted to a trailing edge of a rotor blade. The tab to doubler and doubler to blade bond lines are thin and consist of a cured film adhesive. Conventional aluminum trim tabs are readily adjustable in a field environment through a hand-held tool. The tool contains three rollers that clamp down on the tab and apply a pitching couple. The tool is rolled spanwise along the tab to bend it along its entire length.

Composite trim tabs are also of a three-piece configuration in which a thin thermoplastic-matrix trim tab is mounted between thermoset-matrix composite doublers. Adjusting the thermoplastic-matrix tab is relatively more difficult than an aluminum tab as heating is required to bend the tab. Composite trim tabs are therefore more difficult to adjust in a field environment.

Conventional trim tabs are located in low-strain regions of the blade as cracking of the tabs may otherwise occur if positioned at highly strained regions of the blade. Conventional aluminum trim tabs typically have a lower strain allowable than the trailing edge of the fiberglass/graphite laminate rotor blade. Thermoplastic-matrix composite trim tabs have an allowable strain similar to the trailing edge of the rotor blade, but may be relatively difficult to adjust.

The highest blade normal strains due to edgewise bending occur spanwise at the center of the blade and chordwise at the aft edge. Experience has shown that it would be desirable to position a trim tab at this location because some 3P blade vibrations may be reduced. Conventional trims tabs, however, rapidly fail at these central locations and may not provide a service life which make such positions feasible.

Accordingly, it is desirable to provide a rotor blade trim tab that is readily bendable in the field while achieving an acceptable service life when located at highly strained regions of the blade.

SUMMARY OF THE INVENTION

The rotor blade assembly system according to the present invention provides a trim tab assembly which utilizes relatively thick resilient members bonded between a trim tab and the two trim tab doublers. Spanwise segmenting of the tab and the use of thick, resilient members isolate the segmented aluminum trim tab from normal strain.

The present invention therefore provides a rotor blade trim tab that is readily bendable in the field while achieving an acceptable service life when located at highly strained regions of the blade.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is an expanded view of a trim tab assembly;

FIG. 4 is a top plan view of a trim tab assembly;

FIG. 5 is a chart of various combinations of trim tab arrangements plotted in FIG. 6.

DETAILED DESCRIPTION OF THE PREFERRED EMBODIMENT

Figure 1:
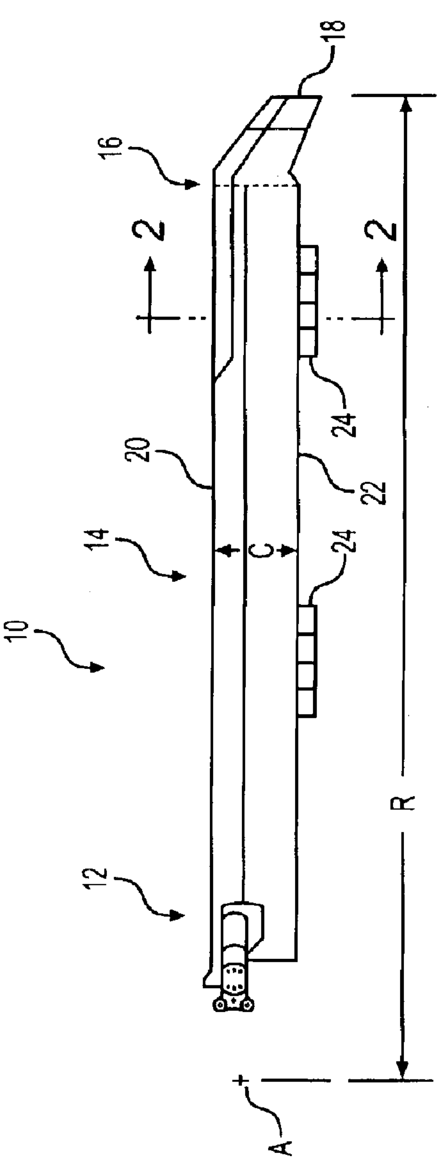
FIG. 1 is a top plan view of an exemplary main rotor blade assembly.

FIG. 1 schematically illustrates an exemplary main rotor blade 10 mounted to a rotor hub assembly (not shown) for rotation about an axis of rotation A. The main rotor blade 10 includes an inboard section 12, an intermediate section 14, and an outboard section 16. The inboard, intermediate, and outboard sections 12, 14, 16 define the span of the main rotor blade 10. The blade sections 12, 14, 16 define a blade radius R between the axis of rotation A and a blade tip 18.

Figure 2:
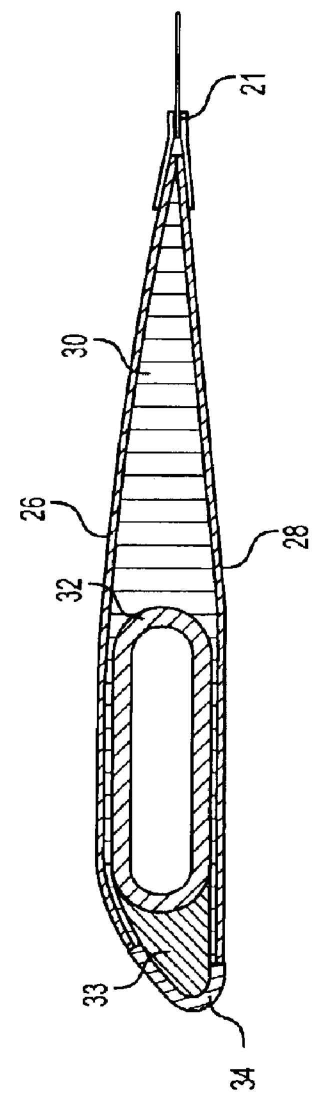
FIG. 2 is a cross-sectional view of the main rotor blade of FIG. 1 taken along line 2—2 thereof.

The main rotor blade 10 has a leading edge 20 and a trailing edge 22, which define the chord C of the main rotor blade 10. Adjustable trim tabs 24 extend rearwardly from the trailing edge 22. Trim tabs 24 designed according to the present invention are locatable along the outboard section 16 as generally known and along the intermediate segment 14 at the center of the blade 10 which has been heretofore unavailable due to the rapid fatigue failure of conventional trim tabs from the highly strained intermediate regions of the rotor blade Referring to FIG. 2, upper and lower skins 26, 28 define the upper and lower aerodynamic surfaces of the main rotor blade 10. The skins 26, 28 are preferably formed from several plies of prepreg composite material such as woven fiberglass material embedded in a suitable resin matrix. A honeycomb core 30, a spar 32, one or more counterweights 33, and a leading-edge sheath 34 form the interior support for the skins 26, 28 of the main rotor blade 10.

It should be understood that relative positional terms such as "forward," "aft," "upper," "lower," "above," "below," and the like are with reference to the normal operational attitude of the vehicle and should not be considered otherwise limiting.

The spar 32 functions as the primary structural member of the main rotor blade 10, reacting the torsional, bending, shear, and centrifugal dynamic loads developed in the rotor blade 10 during operation. The spar 32 is preferably manufactured of a composite of unidirectional laminates comprised of high and low modulus fibers and cross ply laminates comprised of high modulus fibers. It will be appreciated that the rotor blades may be fabricated of other materials, e.g., a metallic spar with metallic or composite skins.

Referring to FIG. 3, an expanded view of the trailing edge 22 and the trim tab assembly 24 is illustrated. The trim tab assembly 24 generally includes an upper and lower composite doubler 34, 36 an upper and lower resilient members 38, 40 and a metallic trim tab 42 between the resilient members 38,40.

The upper and lower composite doubler 34, 36 are attached adjacent the blade trailing edge 22 to the upper and lower skins 26, 28, respectively. Preferably, the doublers 34, 36 are bonded to the skins 26, 28 with an adhesive material M, such as epoxy film adhesive. It should be understood that various adhesives and bonding materials will benefit from the present invention. The doublers 34, 36 are preferably manufactured of material similar to that of the skins 26, 28 such that the doublers 34, 36 have a strain allowable capable of withstanding the rotor blade trailing-edge normal strain.

The upper and lower resilient members 38, 40 are preferably manufactured of a low shear modulus rubber that retains its properties over a wide range of temperatures for long periods of time and that has a high-strength bond to the tab 42 and the composite doublers 34,36. Most preferred is a natural rubber blend, which is simultaneously shaped, vulcanized, and bonded to the tab 42 and doublers 34, 36 using a compression mold at a temperature of approximately 400° F.

Replacing a conventional thin, stiff film adhesive bond line with the relatively thick, resilient members 38, 40 increases the spanwise distance required for a given magnitude of normal strain to be transferred through the bond line. A resilient member 38,40 thickness of 0.043 inches and stiffness of below 530 psi was found to be preferred to maintain strain in the trim tab below an allowable maximum aluminum strain of 346 μinch/inch in order to prevent the aluminum tab from failing in high-cycle fatigue. It should be understood that other combinations for other trim tab lengths, modulus, and thickness of the resilient members will also benefit from the present invention. That is, the permissible modulus and thickness of resilient members are generally related to the trim tab segment length.

The tab 42 is preferably manufactured of a metallic material such as aluminum. The tab 42 is bonded between the resilient members 38, 40 with an adhesive material M' such as CHEMLOK® produced by the Lord Corporation of Erie, Pa., such that the tab 42 is effectively isolated. The tab 42 is preferably segmented into a plurality of relatively short segments S (FIG. 4). For example only, a 48-inch tab is segmented into eight 6-inch segments S such that strain sharing occurs over a greatly decreased distance (FIG. 5). The strain in the aluminum tab 42 therefore must drop to zero at the edges of each segment S. Combining spanwise segmentation with a thick, pliable bond line causes the maximum normal strain in the aluminum to decrease dramatically.

Figure 6:
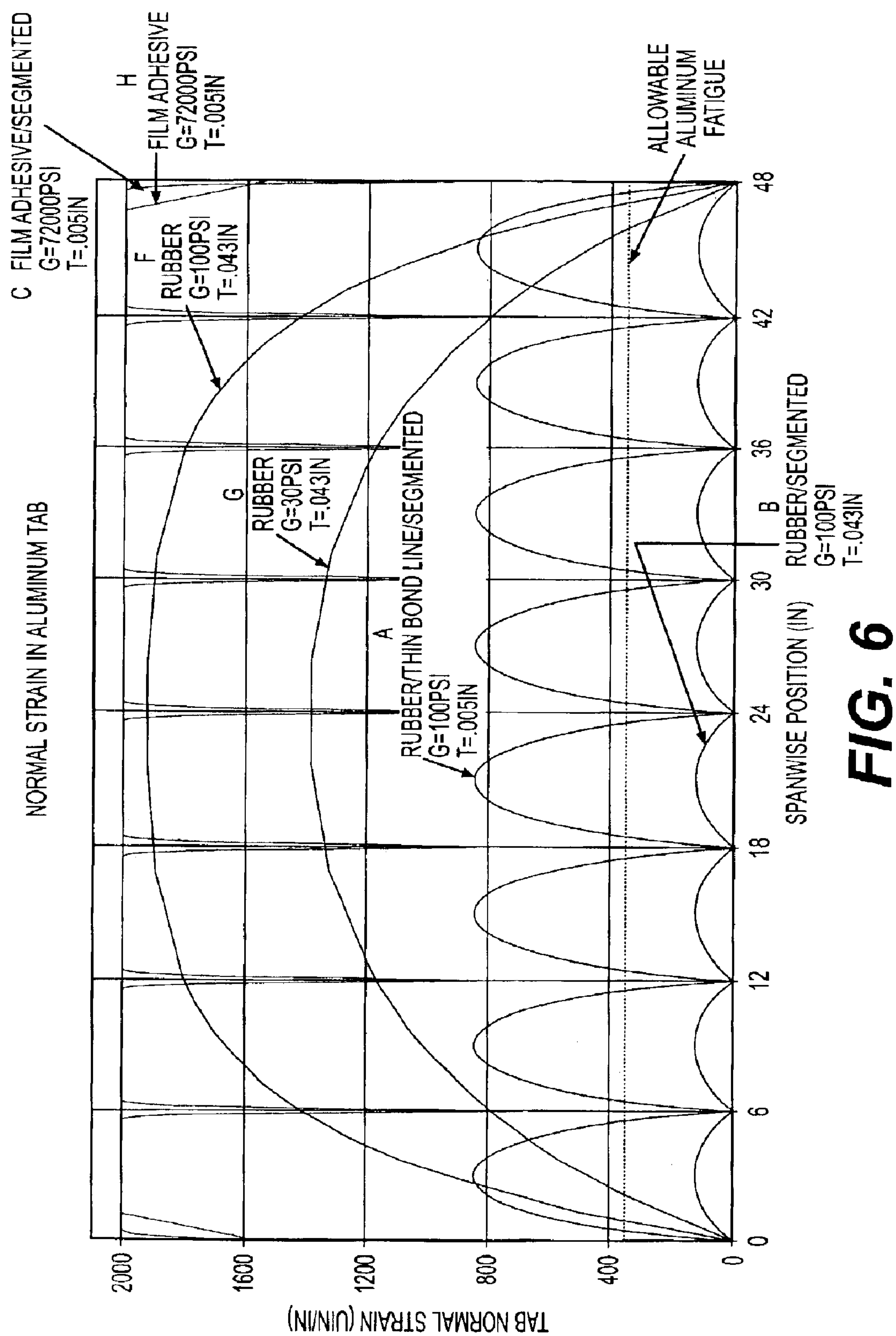
FIG. 6 is a graphical representation of the maximum normal strain calculated by the bonded joint analysis for various combinations of trim tab arrangements.

Referring to FIG. 5, a graphical representation of the maximum normal strain calculated by the bonded joint analysis for various combinations (FIG. 6) of tab spanwise length (6 inches or 48 inches), resilient member stiffness (100 psi or 72000 psi), and resilient member thickness (0.005 inches or 0.043 inches). These results generally show that the preferred design that brings the maximum normal strain down to an acceptable level is a segmented tab bonded to the doublers with a thick, low-modulus resilient member.

Curve F, G and H show normal strain distributions for a 48-inch long trim tab. The maximum dynamic normal strain in the composite doubler is assumed to be +/−2000 μinch/inch, which is the maximum dynamic normal strain observed on the blade trailing edge during flight testing. The results show that when a layer of cured film adhesive is used as the bond line, the normal strain in the aluminum quickly rises to 2000 μinch/inch over a distance of only 1.3 inches. The lowest-stiffness rubber commercially available has a shear modulus, G, of 30 psi. The bonded joint analysis shows that the maximum strain in the aluminum can be decreased to as low as 1382 μinch/inch by using thick, 30 psi rubber pads Curves A and B and C show normal strain distributions for a trim tab that has been segmented into eight 6-inch segments. The normal strain in the aluminum is seen to drop to zero at the edges of each segment. These results show that the maximum strain can be dropped to 125 μinch/inch (curve B; below the required value of 346 μinch/inch) by using relatively thick, 100 psi rubber pads.

The present invention allows aluminum trim tabs to be placed in highly strained regions of a rotor blade without the danger of cracking. Because the tabs are made of aluminum, they can be easily adjusted in the field using a conventional tool which has already seen widespread use.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A trim tab assembly comprising:

a first non-metallic doubler;

a second non-metallic doubler;

a first resilient member attached to said first non-metallic doubler;

a second resilient member attached to said second non-metallic doubler; and an aluminum trim tab attached to said first and second resilient members such that a maximum strain on said aluminum trim tab is below 346 μinch/inch wherein said first and second resilient members are each approximately 0.04 inches thick and are of a shear modulus less than 530 psi.

2. The trim tab assembly as recited in claim 1, wherein said first and second non-metallic doubler are attached to a trailing edge of a rotor blade.

3. The trim tab assembly as recited in claim 1, wherein said aluminum trim tab is segmented.

4. The trim tab assembly as recited in claim 1, wherein said first and second resilient members are manufactured of natural rubber blend.

5. The trim tab assembly as recited in claim 1, wherein said first and second resilient members are each approximately 0.04 inches thick.

6. The trim tab assembly as recited in claim 1, wherein said first and second resilient members are of a shear modulus less than 530 psi.

7. A rotor blade assembly for a rotary wing aircraft comprising:

an upper skin and a lower skin which defines a trailing edge of a rotor blade;

a first non-metallic doubler attached to said upper skin;

a second non-metallic doubler attached to said lower skin;

a first resilient member attached to said first non-metallic doubler;

a second resilient member attached to said second non-metallic doubler; and an aluminum trim tab attached to said first and second resilient members, said aluminum trim cab extends rearwardly from said trailing edge such that a maximum strain on said aluminum trim tab is below 346 μinch/inch wherein said first and second resilient members are each approximately 0.04 inches thick and are of a shear modulus less than 530 psi.

8. The rotor blade assembly as recited in claim 7, wherein said aluminum trim lab is segmented.

9. The rotor blade assembly as recited in claim 7, wherein said aluminum trim tab is segmented to lengths of approximately 6 inches.

10. The rotor blade assembly as recited in claim 7, wherein said first and second resilient members are each approximately 0.04 inches thick.

11. The rotor blade assembly as recited in claim 7, wherein said first and second resilient members are of a shear modulus less than 530 psi.

12. The rotor blade assembly as recited in claim 7, wherein said aluminum trim tab location is within an intermediate section of said trailing edge.

13. A trim tab assembly comprising:

a first non-metallic doubler;

a second non-metallic doubler;

a first resilient member attached to said first non-metallic doubler;

a second resilient member attached to said second non-metallic doubler; and an aluminum trim tab attached to said first an second resilient members such that a maximum strain on said aluminum trim tab is below 346 μinch/inch wherein said first and second resilient members are each of a shear modulus of approximately 100 psi.

14. A rotor blade assembly for a rotary wing aircraft comprising:

an upper skin and a lower skin which defines a trailing edge of a rotor blade;

a first non-metallic doubler attached to said upper skin;

a second non-metallic doubler attached to said lower skin;

a first resilient member attached to said first non-metallic doubler;

a second resilient member attached to said second non-metallic doubler; and an aluminum trim tab attached to said first and second resilient members, said aluminum trim tab extends rearwardly from said trailing edge such that a maximum strain on said aluminum trim tab is below 346 μinch/inch wherein said first and second resilient members are each of a shear modulus of approximately 100 psi.

* * * * *

UNITED STATES PATENT AND TRADEMARK OFFICE

CERTIFICATE OF CORRECTION

PATENT NO. : 6,942,455 B2 Page 1 of 1
DATED : September 13, 2005
INVENTOR(S) : Schmaling et al.

It is certified that error appears in the above-identified patent and that said Letters Patent is hereby corrected as shown below:

<u>Column 5,</u>
Line 4, “cab” should be -- tab --.
Line 11, “lab” should be -- tab --.

<u>Column 6,</u>
Line 3, “an” should be -- and --.

Signed and Sealed this

Twenty-second Day of November, 2005

JON W. DUDAS
*Director of the United States Patent and Trademark Office*